3,001,929
// Patented Sept. 26, 1961

3,001,929
CATALYTIC REFORMING OF NON-AROMATIC HYDROCARBONS
John Arthur Edgar Moy, Peter Thomas White, and Bernard Whiting Burbidge, all of Sunbury-on-Thames, England, assignors to The British Petroleum Company Limited, London, England, a British joint-stock corporation
No Drawing. Filed Feb. 17, 1958, Ser. No. 715,504
Claims priority, application Great Britain Feb. 19, 1957
10 Claims. (Cl. 208—136)

This invention relates to the dehydrogenation or dehydrocyclisation of non-aromatic hydrocarbons and to a catalyst for use in such processes.

According to the present invention, a process for the dehydrogenation or dehydrocyclisation of feedstocks consisting of or containing non-aromatic hydrocarbons comprises contacting the feedstock at elevated temperature with a catalyst comprising chromium oxide on a support, preferably alumina, the catalyst containing also a minor proportion of a spinel.

The name "spinel" is given to a group of compounds having a face-centred cubic crystal structure and having the general formula $MM'_2O_4$, where M and M' are metal radicals. Thus M' may be a monovalent radical and M a hexavalent radical (i.e. $M'_2O.MO_3$) or M' may be a divalent radical and M a tetravalent radical (i.e. $2M'O.MO_2$), or M' may be a trivalent radical and M a divalent radical (i.e. $M'_2O_3MO$).

Particularly effective spinels are chromites, for example, cobalt chromite, $CoCr_2O_4$, copper chromite, $CuCr_2O_4$, iron chromite, $FeCr_2O_4$, and also titanates, for example, zinc titanate, $Zn_2TiO_4$. All these spinels may be prepared artificially and used in that form, but iron chromite also occurs naturally in the ore "chrome ironstone." This ore may contain up to 50% or more of iron chromite and the use of the ore itself without separation of pure iron chromite is included within the scope of this specification.

The catalyst may also contain a minor proportion of other promoting elements for example an alkali metal, particularly potassium.

The process is preferably carried out at a pressure of not more than 50 p.s.i.g. and without recycle of the hydrogen-containing gas produced in the process or addition of extraneous hydrogen. An appreciable quantity of such gas is produced, which is available as a valuable by-product. The term "not more than 50 p.s.i.g." includes atmospheric pressure or below, atmospheric pressure being, in fact, preferred. The preferred temperature range is 450 to 580° C. and the space velocity may be 0.1 to 1.0 v./v./hr. When used within the process conditions set out in this paragraph it has been found that the spinel-promoted chromia/alumina catalysts are most effective under severe processing conditions giving products with research octane numbers (clear) of 100 or more. At this high octane number level, the decrease in yield with increase in octane number is less rapid with spinel-promoted chromia/alumina catalysts than with, for example, a known catalyst of chromia/alumina promoted with cerium and potassium. Hence the yield for a given octane number is greater.

The catalyst may be used in the form of a fixed bed, a moving bed or a fluidised bed. Since the catalyst is readily regenerated by burning off carbonaceous deposits in a stream of oxygen-containing gas, it is particularly suitable for fluidised or moving bed processes.

The feedstocks used may be pure hydrocarbons, for example straight-chain paraffins or cyclo-paraffins, or mixtures of hydrocarbons boiling within the gasoline or naphtha range. A particularly preferred feedstock is a $C_5$ to $C_7$ non-aromatic hydrocarbon or a mixture consisting predominantly of $C_5$ to $C_7$ non-aromatic hydrocarbons.

Thus according to one embodiment of the invention the feedstock may be a straight-run feedstock, particularly a lower-boiling straight-run fraction commonly known as light gasoline. By treatment according to the present invention gasoline blending components of high octane number and high volatility may be prepared from such feedstocks, in particular gasoline blending components having a research octane number (clear) of at least 90 and a volatility of at least 70% evaporated at 100° C.

According to a further embodiment the feedstock may be the product of a previous catalytic reforming process so that the present invention includes a two-stage reforming process designed to produce aromatics and high octane gasoline fractions with preferably a research octane number (clear) of the order of 100. Any convenient reforming process may be used as the first stage, but those employing a catalyst of platinum on a support containing aluminum oxide with or without halogen are preferred, such processes being hereinafter referred to as platinum reforming processes and the products as platinum reformates.

With a two-stage process, the whole of the reformate from the first stage may be reformed in the second stage, but since the higher boiling end is rich in aromatics which are not susceptible to further upgrading, the reformate is preferably fractionated to give a lower-boiling relatively aromatic-free fraction which is subjected to the further treatment. Alternatively the reformate may be solvent extracted and the raffinate or a fraction thereof subjected to the further treatment. If desired, the product may be recombined with the higher boiling fraction or the solvent extract as the case may be, but it may also be combined with other high octane components for example heavy cat. cracked gasoline or alkylate.

The present invention includes a dehydrogenation or dehydrocyclisation catalyst comprising chromium oxide on a support, preferably alumina, and a minor proportion of a spinel. Particularly effective spinels are cobalt, copper and iron chromites, and zinc titanate. The preferred proportions, by weight of the material stable at 1020° F., are within the limits:

| | |
|---|---|
| Chromium oxide | 5% to 25%. |
| Spinel | 0.1% to 10%, particularly 2% to 5% (but less than the chromium oxide). |
| Other promoting elements (expressed as oxide) | 0.1% to 5%. |
| Alumina | Balance. |

The catalyst may be prepared by any convenient technique such as co-precipitation or impregnation.

The invention is illustrated by the following examples.

EXAMPLE 1

A copper chromite/chromia/alumina catalyst was prepared as follows:

Copper chromite was prepared by roasting an intimate mixture of copper nitrate and chromic oxide for two hours at 700° C. (1292° F.). The product was extracted with hot dilute nitric acid, washed and dried.

4 g. copper chromite were suspended in a solution of 1326 g. aluminium nitrate in 1½ l. distilled water. 650 ml. Analar ammonia solution (sp. gr. 0.88) were added with vigorous stirring. The slurry was filtered, washed with 6 l. warm distilled water and finally with 1 litre 4% vol. acetic acid solution. The filter cake was dried overnight at 50° C., for 3 hours at 120° C. and calcined at 550° C. for 2 hours. The calcined material was pelleted to 3/16 in. and impregnated with 28 g. Analar chromium trioxide dissolved in 80 ml. distilled water. The catalyst was dried at 120° C. and calcined at 550° C. for 2 hours.

EXAMPLE 2

A reformate obtained by reforming a straight-run naphtha fraction over a catalyst of platinum, alumina and combined halogen was split into light and heavy fractions, the light fraction having an end boiling point of 108° C. and a research octane number (clear) of 76.1. This light platinum reformate was further reformed under the following conditions:

Pressure_____ Atmospheric.
Space velocity_____ 0.2 v./v./hr.
Recycle gas_____ None.
Processing period_____ 5 hours.

The results are shown in Table 1 below.

Table 1

| Catalyst composition | Reaction temperature, °C. | Debutanized liquid product | | Exit gas | |
|---|---|---|---|---|---|
| | | Yield, percent wt. | Octane number, research, clear | Flow rates s.c.f./b. | H₂ content, percent vol. |
| (1) 10% Cr₂O₃/Al₂O₃. | 475 | 75 | 94.2 | 883 | 80 |
| | 530 | 67 | 100.1 | 1,865 | 77 |
| (2) 10% Cr₂O₃/Al₂O₃+1% CoCr₂O₄. | 475 | 79 | 94.7 | 1,140 | 75 |
| | 530 | 59 | 102.5 | 2,200 | 67 |
| (3) 10% Cr₂O₃/Al₂O₃+2% CoCr₂O₄. | 475 | 71 | 95.5 | 1,170 | 68 |
| | 530 | 52 | 104.4 | 2,240 | 63 |
| (4) Al₂O₃+1% CoCr₂O₄. | 475 | 91 | 74.4 | 60 | <30 |
| | 530 | 77 | 82.7 | 610 | 48 |
| (5) Al₂O₃+10% CoCr₂O₄. | 475 | 82 | 82.1 | 520 | 84 |
| | 530 | 42 | 94.0 | 2,620 | 85 |

From the table it will be seen that runs 2 and 3 using catalysts containing both chromium oxide and cobalt chromite supported on alumina gave products with appreciably higher octane numbers than runs 1, 4 and 5 in which the catalysts consisted of an alumina base supporting only one of the chromium compounds, i.e., either chromium oxide or cobalt chromite but not both.

EXAMPLE 3

A light, staight-run gasoline fraction having an end boiling point of 112° C. and a research octane number (clear) of 61.2 was processed under the following conditions over a catalyst consisting of 10% chromia on alumina promoted with 2% cobalt chromite.

Pressure_____ Atmospheric.
Space velocity_____ 0.2 v./v./hr.
Recycle gas_____ None.
Processing period___ 5 hours.
Catalyst_____ Chromium oxide and cobalt chromite supported on alumina.

The results are set out in Table 2.

Table 2

| Reaction temperature, °C. | Debutanized liquid product | | Exit gas | |
|---|---|---|---|---|
| | Yield, percent wt. | Octane number, research, clear | Flow rate, s.c.f./b. | H₂ content, percent vol. |
| 475 | 76 | 81.5 | 1,200 | 71 |
| 530 | 50 | 98.8 | 2,730 | 73 |

EXAMPLE 4

A lower boiling fraction of a reformate obtained by reforming a straight run naphtha fraction over a catalyst of platinum, alumina and combined halogen, having a boiling range of C₅ to 110° C. and a research octane number (clear) of 72.9 was processed under the following conditions over a catalyst consisting of 10% chromia on alumina promoted with 2% copper chromite:

Pressure_____ Atmospheric.
Space velocity_____ 0.2 v./v./hr.
Recycle gas_____ None.
Processing period___ 5 hours.
Catalyst_____ Chromium oxide and copper chromite supported on alumina.

The results are set out in Table 3.

Table 3

| Reaction temperature, °C. | Debutanized liquid product | | Exit gas | |
|---|---|---|---|---|
| | Yield, percent wt. | Octane number, research, clear | Flow rate, s.c.f./b. | H₂ content, percent vol. |
| 475 | 79 | 91.4 | 1,060 | 75 |
| 530 | 48 | 102.3 | 2,220 | 61 |

EXAMPLE 5

Example 4 was repeated using the same feedstock and process conditions but with a catalyst consisting of 10% chromia on alumina promoted with 2% zinc titanate.

The results are set out in Table 4.

Table 4

| Reaction temperature, °C. | Debutanized liquid product | | Exit gas | |
|---|---|---|---|---|
| | Yield, percent wt. | Octane number, research, clear | Flow rate, s.c.f./b. | H₂ content, percent vol. |
| 475 | 81 | 91.2 | 930 | 85 |
| 530 | 58 | 101.9 | 2,140 | 79 |

EXAMPLE 6

Naturally-occurring "chrome ironstone" ore containing about 50% of iron chromite spinel was ground to a particle size of less than 40 microns. 10 g. of this ground chrome ironstone were suspended in a solution of 1326 g. aluminium nitrate in 1½ litres distilled water. 650 ml. Analar ammonia solution (sp. gr. 0.88) were added with vigorous stirring. The slurry was filtered and washed with 6 litres warm distilled water. The filter cake was dried overnight at 50° C., for 3 hours at 120° C. and calcined at 550° C. for 2 hours. The calcined material was impregnated with 28 g. Analar chromium trioxide dissolved in 80 ml. distilled water. The catalyst was dried at 120° C. and calcinced at 550° C. for 2 hours.

EXAMPLE 7

A light platinum reformate having the same boiling range and research octane number (clear) as that used in Example 4 was processed under the following conditions:

Reaction temperature_____ 530° C.
Pressure_____ Atmospheric.
Space velocity_____ 0.2 v./v./hr.
Recycle gas_____ None.
Processing period_____ 5 hours.

Comparative runs were carried out using different catalysts. The catalysts used and the results obtained are set out in Table 5 below.

Table 5

| Catalyst | Debutanised liquid product | | Exit gas | |
|---|---|---|---|---|
| | Yield, percent wt. | On (Res.) clear | Flow rate, s.c.f./b. | $H_2$ content, percent vol. |
| 10% chromia on alumina, promoted with 1% cerium and 1% potassium | 67.0 | 100.6 | 1,845 | 83.2 |
| 10% chromia on alumina, promoted with 5% "chrome ironstone" (as prepared in Example 6) | 50.4 | 103.9 | 2,138 | 74.8 |

EXAMPLE 8

Further runs were carried out using the light platinum reformate of Example 7, under the same conditions of pressure, space velocity and processing period and the same absence of recycle gas as in Example 7. A wider range of temperatures was, however, used. Two catalysts were tested—a chromia/alumina catalyst promoted with synthetic iron chromite, prepared in a manner similar to that described in Example 1, and a chromia/alumina catalyst promoted with 5% chrome ironstone and also 1% of potassium oxide.

The temperatures used and the results obtained are set out in Table 6 below.

Table 6

| Catalyst | Temperature, °C. | Debutanised product | | Exit gas | |
|---|---|---|---|---|---|
| | | Yield, percent wt. | On (Res.) clear | Make, s.c.f./b. | $H_2$ content, percent vol. |
| 10% $Cr_2O_3/Al_2O_3$ + 5% Synthetic $FeCr_2O_4$. | 475<br>530 | 81.3<br>59.4 | 90.4<br>101.6 | 865<br>2,048 | 79.5<br>79 |
| 10% $Cr_2O_3/Al_2O_3$ + 5% Chrome Ironstone+1% $K_2O$. | 475<br>530<br>550 | 81.6<br>67.3<br>62.4 | 93.1<br>100.7<br>102.0 | 1,028<br>2,101<br>2,170 | 89.3<br>82.9<br>78.8 |

We claim:

1. A process for the treatment of a hydrocarbon feedstock containing at least a major proportion of non-aromatic hydrocarbons to produce a product having an increased aromatic content comprising contacting the hydrocarbon feedstock in a reaction zone with a catalyst consisting essentially of, by weight of the total catalyst stable at 1020° F., 5 to 25% chromium oxide, 0.1 to 10% of a spinel having a face-centered cubic crystal structure and having the general formula $MM'_2O_4$, wherein M and M' are different metal radicals, and balance alumina, the amount of said spinel being less than that of the chromium oxide, at a temperature of from about 450 to 580° C., at a pressure not in excess of about 50 p.s.i. ga., and in the absence of added hydrogen to the reaction zone, and recovering a product having an increased aromatic content.

2. A process for the treatment of a hydrocarbon feedstock containing at least a major proportion of non-aromatic hydrocarbons to produce a product having an increased aromatic content comprising contacting the hydrocarbon feedstock in a reaction zone with a catalyst consisting essentially of, by weight of the total catalyst stable at 1020° F., 5 to 25% chromium oxide, 0.1 to 10% of a spinel having a face-centered cubic crystal structure, said spinel being selected from the group consisting of metal chromites and metal titanates, and balance alumina, the amount of said spinel being less than that of the chromium oxide, at a temperature of from about 450 to 580° C., at a pressure not in excess of about 50 p.s.i. ga., and in the absence of added hydrogen to the reaction zone, and recovering a product having an increased aromatic content.

3. A process as claimed in claim 1, wherein the catalyst contains 2% to 5% of spinel.

4. A process as claimed in claim 1, wherein the catalyst contains also 0.1% to 5% of an alkali metal, expressed as oxide.

5. A process as claimed in claim 1, which is carried out at a space velocity of 0.1 to 1 v./v./hr.

6. A process as claimed in claim 1, wherein the product has a research octane number, clear of at least 100.

7. A process as claimed in claim 1, wherein the feedstock is selected from the group consisting of $C_5$ to $C_7$ non-aromatic hydrocarbons and mixtures consisting predominantly of $C_5$ to $C_7$ non-aromatic hydrocarbons.

8. A process as claimed in claim 1, wherein the feedstock is a straight-run distillate.

9. A process as claimed in claim 1, wherein the feedstock is selected from the group consisting of catalytic reformates and portions thereof.

10. A process as claimed in claim 9, wherein the catalytic reformate is a platinum reformate.

References Cited in the file of this patent

UNITED STATES PATENTS

| | | |
|---|---|---|
| 2,278,223 | Sturgeon | Mar. 31, 1942 |
| 2,584,531 | Arnold et al. | Feb. 5, 1952 |
| 2,658,858 | Lang et al. | Nov. 10, 1953 |
| 2,822,336 | Polack | Feb. 4, 1958 |
| 2,846,365 | Gladrow | Aug. 5, 1958 |

UNITED STATES PATENT OFFICE

CERTIFICATE OF CORRECTION

Patent No. 3,001,929            September 26, 1961

John Arthur Edgar Moy et al.

It is hereby certified that error appears in the above numbered patent requiring correction and that the said Letters Patent should read as corrected below.

Column 4, line 3, for "a straight run naphtha" read -- a straight-run naphtha --; column 6, line 32, for "number, clear of at least" read -- number, clear, of at least --.

Signed and sealed this 3rd day of April 1962

(SEAL)
Attest:

ERNEST W. SWIDER
Attesting Officer

DAVID L. LADD
Commissioner of Patent